(No Model.)
C. TEPEL.
ELECTRIC ARC LAMP.
No. 599,880. Patented Mar. 1, 1898.
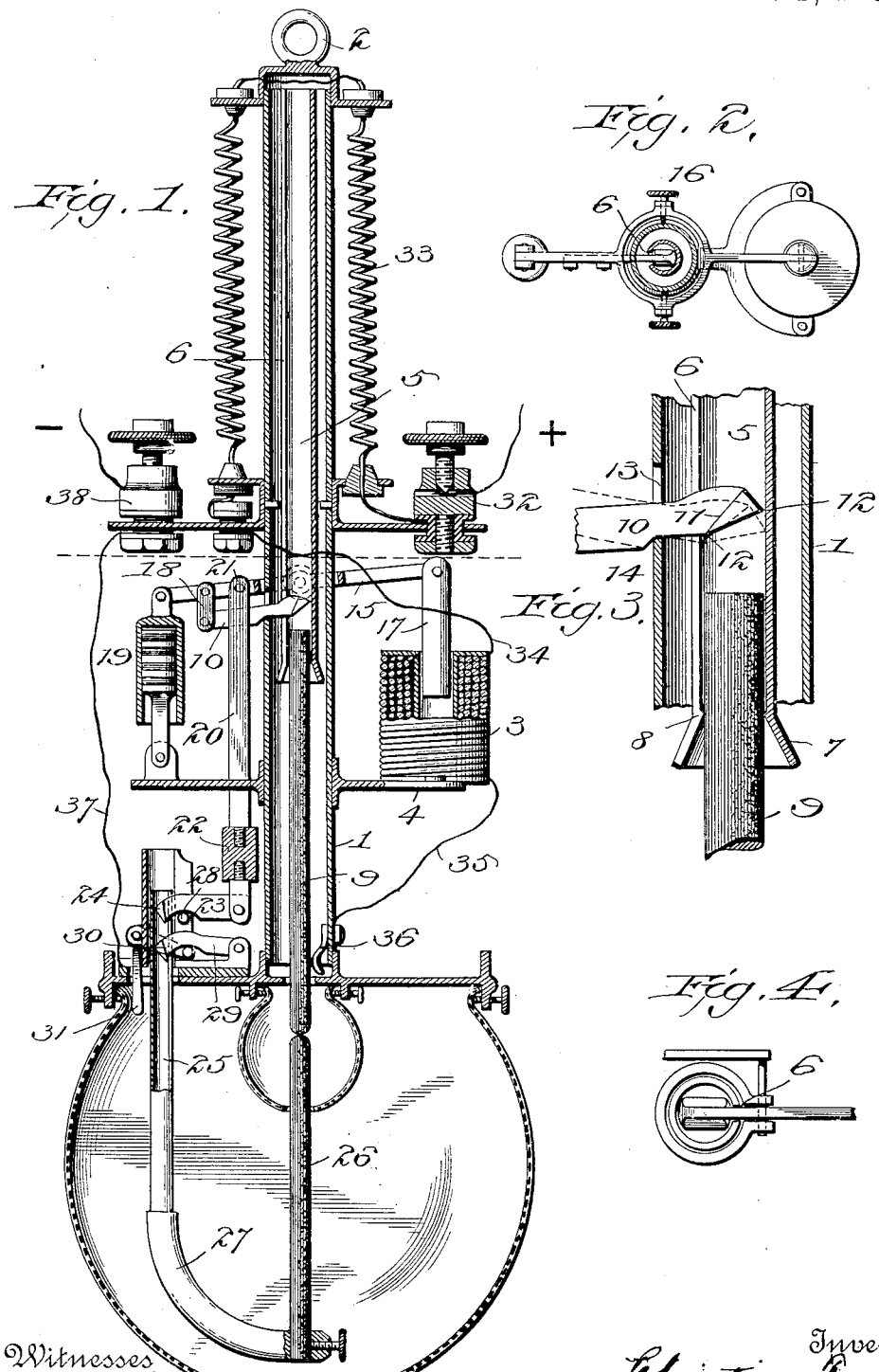
Witnesses
Inventor:
Christian Tepel
Attorney

UNITED STATES PATENT OFFICE.

CHRISTIAN TEPEL, OF BENNETT, PENNSYLVANIA.

ELECTRIC-ARC LAMP.

SPECIFICATION forming part of Letters Patent No. 599,880, dated March 1, 1898.

Application filed December 31, 1896. Renewed January 27, 1898. Serial No. 668,228. (No model.)

*To all whom it may concern:*

Be it known that I, CHRISTIAN TEPEL, a citizen of the United States, residing at Bennett, in the county of Allegheny and State of Pennsylvania, have invented certain new and useful Improvements in Arc-Lamps; and I do declare the following to be a full, clear, and exact description of the invention, such as will enable others skilled in the art to which it appertains to make and use the same, reference being had to the accompanying drawings, and to the figures of reference marked thereon, which form a part of this specification.

The object of my invention is to provide an exceedingly simple, cheap, and durable mechanism which will effect a positive differential feed to both carbons for the purpose of maintaining the arc at one point until both carbons are consumed.

A further object of my invention is to provide a superior mechanism adapted to be actuated by a single electromagnet.

To this end my invention consists in the peculiar features and combination of parts more fully described hereinafter and pointed out in the claims.

In the accompanying drawings, Figure 1 represents a vertical sectional view of my complete invention; Fig. 2, a transverse section through $x$ $x$ of the preceding figure; Fig. 3, an enlarged detail view of the upper-carbon holder and the dog or clutch for gripping it, and Fig. 4 an additional detail view of the top of the carbon and the dog-head.

The various parts of the lamp are attached to a vertical tube 1, forming a part of the frame portion of the lamp and being provided at the top with the usual suspending-ring 2 and at the bottom with a disk, from which are suspended an inner and outer globe. All of the operating mechanism is automatically actuated by a single electromagnet 3, resting on a shelf 4 on the right-hand side of the lamp. The upper-carbon holder consists of an inner tube 5, located to move vertically within the outer tube 1. A longitudinal slot 6 extends throughout the entire length on the left-hand side of the tube 5, and its lower end is provided with a flaring mouth 7 and an annular gripping edge 8. The longitudinal slot allows the tube to spread apart and grip the carbon when the latter is inserted. The holder or tube, and hence the carbon, is suspended by means of a dog 10, which passes through a hole 13 in the outer tube, thence through the longitudinal slot 6 into the interior of the tube. This dog is provided with a head 11, having relatively oblique gripping edges 12, adapted to engage the opposite sides of the tube when tilted downward across the inside of the tube and to release its hold when tilted upward. The dog rests loosely on the lower edge 14 of the hole. This lower edge serves as a fulcrum on which to tilt the dog upward. The means by which the dog is actuated consists of a crosswise rocking lever 15, fulcrumed on the outside of the tube 1 by means of the set-screws 16. The right-hand end of the lever is attached to the core 17 of the magnet, and its left-hand end to the dog by means of a link 18. An air-cushion 19 is provided to ease the action of the parts and overbalance the gravity of the core 17 on the opposite end of the lever. The lower-carbon feeder is actuated by a somewhat similar mechanism and is connected to the upper-carbon-feeding mechanism through the medium of a rod 20, pivotally suspended from the cross-lever 15 at a point half-way between the fulcrum 16 of the latter and the point where the link 18 is attached, in order to lift the rod 20, and hence the lower carbon, up one-half as fast as the upper carbon. A turnbuckle 22 is applied to the rod 20 to regulate its length, and hence the relative distance apart of the two carbon-holders. Pivotally attached to the lower end of the rod 20 is a second dog 23, provided with a head 24, which passes into a longitudinally-slotted vertical tube 25, like the upper tube 5. This head is provided with biting edges, also like those of the dog 10, previously described, so that as the dog is raised by the rod 20 it will be thrown into an oblique position across the tube and the biting edges will engage its inner wall to lift the tube, and hence the holder 27 and the lower carbon 26. The free end of the dog rests on a pin 28, which acts as a fulcrum when the connecting-rod 20 is lowered and the head of the dog raised to release its grip upon the tube 25. When thus relieved by the upper dog 23, a lower dog 29, constructed like the upper dog, engages and sustains the tube in the position to which it is raised, but allows the tube to move freely upward. This dog 29 is provided with a lifting and releasing arm 30, actuated by a handle 31. When the handle 31 is moved toward the right, it will lift the arm 30 and raise the pawl 29, so that the lower-carbon holder can be dropped down into position for renewing the carbon and resetting the lamp.

The current enters the lamp at binding-post 32, and, after having traversed the resistance-coil 33, passes through wire 34 to the electromagnet 3, whence it proceeds through wire 35 and shoe 36 to the upper carbon 9. Passing from the upper carbon to the lower carbon 26 it goes on through the holder 27, the slotted tube 25, wire 37, and out at the binding-post 38.

The preferred form of my device having been set forth, I will now describe its operation.

Assuming that the lamp has been newly trimmed and the carbon-points are together, the passage of the current through the magnet will draw down the core, and with it the right-hand end of the cross-lever 15. This lifts the left-hand end of the lever, which in turn raises the outer ends of the lifting-dogs or clutches in both the tubes 5 and 25, so that they will grip and lift the latter upward, the upper tube, and hence the upper carbon, moving upward twice as fast as the lower carbon until the arc is formed. A continued upward movement will separate the carbons until the current is weakened sufficiently to allow the left-hand end of the lever to overbalance the core of the magnet. In this action the outer end of the dog 10 of the upper carbon is rocked downward, thereby lifting the head in the tube 5 and allowing the latter, with its carbon, to descend by gravity and shorten the arc. Simultaneously with these movements the lower dog 23 is tilted and released from the lower tube 25, whereupon the second lower dog 29 will catch and hold it against dropping. The approach of the carbons again excites the magnet at the proper moment to produce the required arc, all of which is so well known in the art as to require no further description.

Among the advantages of my construction are those of maintaining the arc at one point in the globe, effecting a positive, fine and perfect feed for the lower carbon much more perfectly than by the use of a spring, and producing a more simple, cheap, and desirable construction which can be kept in order with less attention and repairs.

Having thus described my invention, what I claim as new, and desire to secure by Letters Patent, is—

1. An arc-lamp provided with an electromagnetic feeding mechanism and a vertically-movable slotted tubular holder for the upper carbon, in combination with a mechanical feeding mechanism provided with a slotted tubular holder for the lower carbon, pivoted dogs having heads located within the tubes, a longitudinally-adjustable connection between the two feeding mechanisms for effecting a positive differential feed, whereby the arc is maintained at the one point, substantially as described.

2. In an arc-lamp an electromagnet, in combination with lever connections provided with slotted tubes engaged by pivoted clutches or dogs, upper and lower carbon holders actuated thereby, and a longitudinally-adjustable mechanical connection between the two feeding devices whereby their distance from each other can be regulated, substantially as described.

3. In an arc-lamp, the combination with an electromagnet, of a pair of vertical hollow and longitudinally-slotted carbon-holders for the upper and lower carbons, pivoted dogs or clutches passing through the slots and engaging the interior of each of the holders, compound-lever mechanism connected with and actuating the dogs, and a longitudinally-adjustable connection between the upper and lower carbon feeding mechanisms, substantially as described.

4. The combination with an electromagnet, of a vertical, slotted tubular holder for the upper carbon, a lever actuated by said magnet, a pivoted dog provided with a head located within the tube and adapted to engage its inner walls to hold the tube up, a lower-carbon holder comprising a vertically-movable slotted tube, a pivoted dog provided with a head located within the tube, a second pivoted dog disposed to grip the tube when released by the first dog, said lower tube being located out of line with the upper tube and having a laterally-extending portion on its lower end for supporting the lower carbon, substantially as described.

5. In an arc-lamp, the combination with a vertical tube, and rigid frame portion 1, an electromagnet on one side thereof, an air-cushion on the opposite side, a rocking lever fulcrumed on the tube and disposed transversely in relation thereto, upper and lower dogging devices connected to and controlled by said lever to actuate the carbons, and a vertically-extending longitudinally-adjustable connection between said lever and the lower dogging mechanism, substantially as described.

6. In an arc-lamp, the combination with a slotted tube, of a dog extending through the slot and into the tube to engage the inside thereof, and a lifting hand-lever in connection with the dog to lift it independently of the tube for the purpose of releasing the latter, substantially as described.

7. In an arc-lamp, the combination with a vertical tube constituting part of the fixed frame portion, of a slotted tubular carbon-holder located to move up and down within the tube to hold and actuate the upper carbon, an electromagnet, a dog in connection with the magnet arranged to engage said tube, a lower vertically-extending slotted carbon-holding tube disposed at one side of the upper carbon-holding tube and being provided with a lateral extension which supports the lower carbon, dogs arranged and adapted to enter and engage the lower carbon-holding tube, and a vertical connection between the lever mechanism above and the dogs below substantially as described.

8. In an arc-lamp, an electromagnetic controlling device and a vertical, longitudinally-slotted carbon-holding tube for supporting the upper carbon, in combination with a vertical slotted tube located at one side of the upper tube for holding the lower carbon, and pivoted dogs controlled by the magnet and in engagement with the inside of the tubes, substantially as described.

In witness whereof I affix my signature in presence of two witnesses.

CHRISTIAN TEPEL.

Witnesses:
    SEBASTIAN SCHERF,
    W. A. YOUNG.